(No Model.)
L. FINGER.
HORSESHOE.
No. 411,957. Patented Oct. 1, 1889.
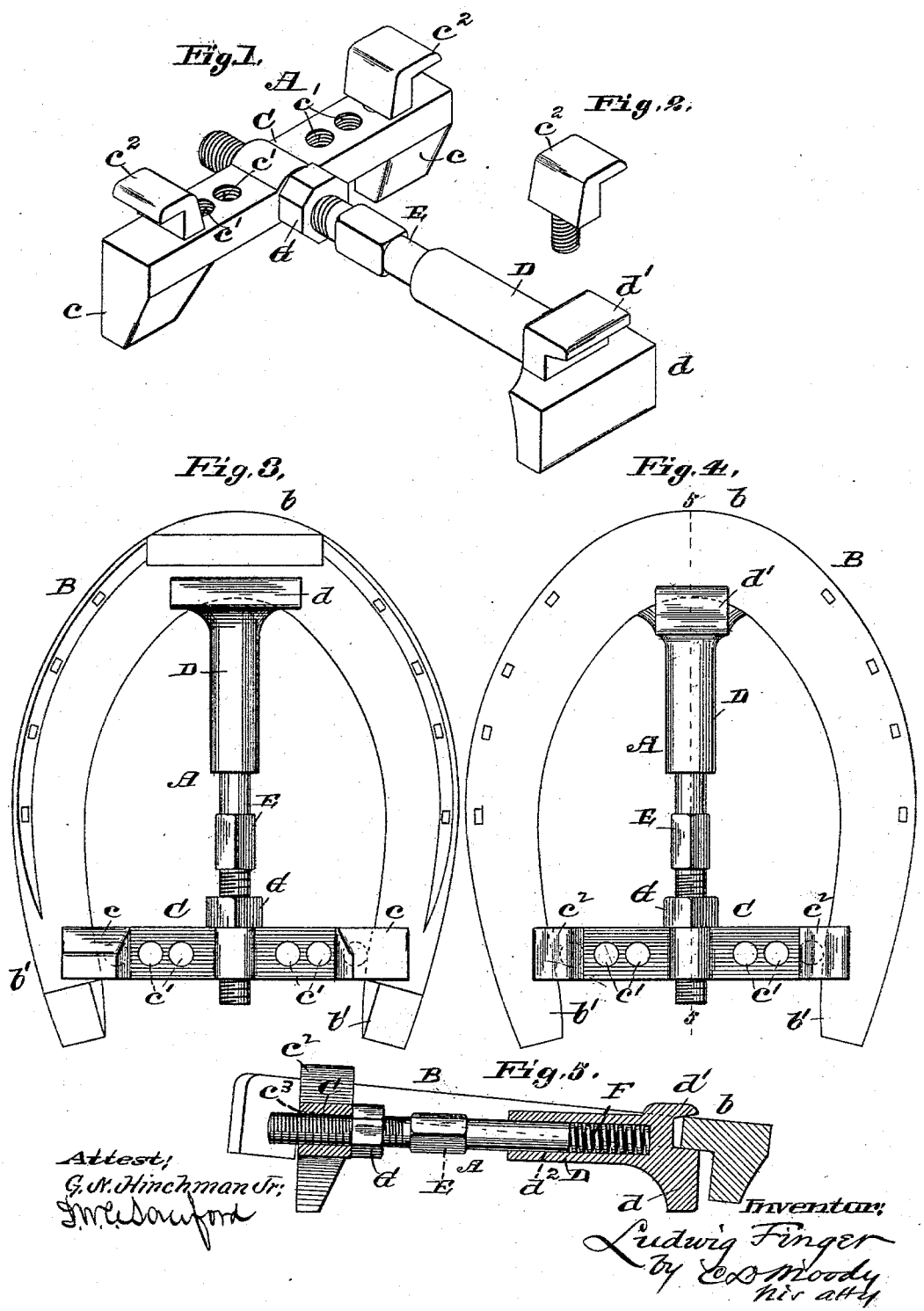

UNITED STATES PATENT OFFICE.

LUDWIG FINGER, OF ST. LOUIS, MISSOURI.

HORSESHOE.

SPECIFICATION forming part of Letters Patent No. 411,957, dated October 1, 1889.

Application filed April 22, 1889. Serial No. 308,211. (No model.)

*To all whom it may concern:*

Be it known that I, LUDWIG FINGER, of St. Louis, Missouri, have made a new and useful Improvement in Horseshoes, of which the following is a full, clear, and exact description.

The present invention is a calk-bearing attachment adapted to be applied to existing forms of horseshoes.

It consists in the special construction hereinafter set forth and claimed, and illustrated in the annexed drawings, making part of this specification, in which—

Figure 1 is a view in perspective of the attachment; Fig. 2, a view in perspective of one of the adjustable lugs used upon the cross-bar at the rear end of the attachment; Fig. 3, a bottom view of the horseshoe having the attachment applied thereto; Fig. 4, a top view of the same, and Fig. 5 a longitudinal section on the line 5 5 of Fig. 4.

The same letters of reference denote the same parts.

A, Fig. 1, represents the improved attachment, and B, Figs. 3, 4, and 5, represents an ordinary horseshoe.

The attachment is composed substantially of the following elements in combination: First, a cross-bar C, which, when the attachment is applied to the horseshoe, extends across the shoe at the heel thereof, is provided at its ends, respectively, with calks $c\ c$ and toward each of its ends having perforations $c'\ c'$ to receive the lugs $c^2\ c^2$; second, a longitudinal bar D, which at its forward end is applied to the toe of the shoe and thence extends backward, and at its forward end is provided with the calk $d$ and the lug $d'$, and at its rear end is recessed, substantially as is shown at $d^2$; third, a thrust-bar E, and, fourth, a spring F. The spring is inserted in the recess $d^2$, and then the forward end of the thrust-bar is entered into the recess and made to bear against the spring. The rear end of the thrust-bar is threaded and made to engage in a threaded perforation $c^3$ in the cross-bar C, and according as the thrust-bar is screwed into or out of said perforation $c^3$ is the attachment shortened or lengthened.

In applying the attachment the toe $b$ of the horseshoe is received between the calk $d$ and the lug $d'$ of the bar D, and the heels $b'\ b'$ are respectively held between the calk $c$ and lug $c^2$ at each end of the cross-bar C, substantially as shown. The lugs $c^2\ c^2$ are adjusted in the perforations $c'\ c'$ to suit the width of the horseshoe. The attachment is tightened to the horseshoe by unscrewing the thrust-bar E. The spring F, which elastically supports the inner end of the bar E, serves to prevent that bar from working loose. The jam-nut G upon the thrust-bar can, by turning it upon that bar so as to cause it to bear against the cross-bar C, be used to tighten the bar E in the cross-bar C. The spring F and the jam-nut G coact. The spring alone is of service in holding the bar E in the bar C.

I claim—

1. The herein-described horseshoe attachment, consisting of the cross-bar having the calks and adjustable clips, the longitudinal bar having the calk and lug, the thrust-bar, and the spring, said longitudinal bar having a recess to receive said spring and the forward end of said thrust-bar, and said cross-bar having a threaded perforation to receive the rear end of said thrust-bar, substantially as described.

2. The combination of the cross-bar having the calks and the adjustable lugs, the longitudinal bar having the calk and lug at its forward end and being recessed at its rear end, the thrust-bar, the spring, and the jam-nut, the said spring and the forward end of said thrust-bar being held in said recess, the rear end of said thrust-bar engaging in a threaded perforation in said cross-bar, and said jam-nut being applied to said thrust-bar, substantially as described.

3. The combination of the horseshoe, the cross-bar, the longitudinal bar, the thrust-bar, and the spring, said cross-bar and longitudinal bar having the calks and lugs, as described, said spring being held in a recess within said longitudinal bar, and said thrust-bar being at one end thereof held in said recess against said spring and at its opposite end engaging in a threaded perforation in said cross-bar, substantially as described.

Witness my hand this 16th day of April, 1889.

LUDWIG FINGER.

Witnesses:
C. D. MOODY,
W. J. KESL.